Figure 1:
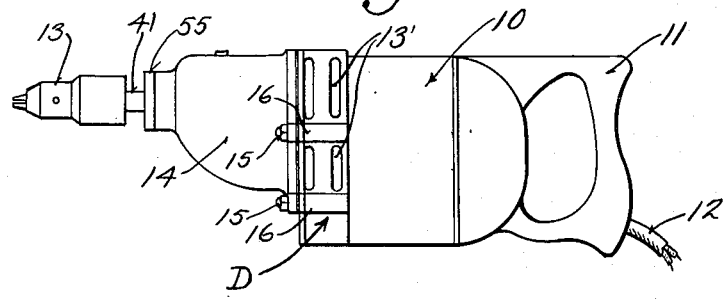

Aug. 5, 1958     V. V. MILLER     2,845,806

TWO SPEED DRILL

Filed Aug. 19, 1955

INVENTOR
VANCE V. MILLER

BY

*Young Wright*

ATTORNEYS

United States Patent Office 2,845,806
Patented Aug. 5, 1958

2,845,806

TWO SPEED DRILL

Vance V. Miller, Milwaukee, Wis.

Application August 19, 1955, Serial No. 529,485

1 Claim. (Cl. 74—343)

This invention appertains to portable electric hand drills, and more particularly to a new and novel unit for obtaining two speeds in the chuck shaft and drill bit.

To my knowledge, present type hand electric drills include only one speed for the chuck shaft and drill bit, even though they provide a chuck adapted to hold different size drill bits. It has been found that larger size drill bits should not be rotated at the same speed as the smaller drill bits, and further, certain types of material require different speeds of rotation of the drills. While this problem has been recognized in larger types of boring machine tools, no one to my knowledge has approached this problem in regard to portable hand type electric drills.

It is, therefore, a primary object of my present invention to provide a portable hand electric drill in which the chuck shaft may be rotated at two different selected speeds.

Another important object of my invention is to provide a compact two speed gear arrangement housed forward of the main drill housing and forming a neat and comparatively small arrangement for hand electric drills.

A further object of my invention is to provide a novel arrangement of gears whereby one gear may be shifted to one position to provide a relatively high speed rotation in the chuck shaft and shifted to another position to provide a lower speed of rotation in the chuck shaft.

Another object of my present invention is to provide a novel two speed gearing arrangement for the chuck shaft which includes, a two-piece chuck shaft, each piece being freely rotatable in reference to one another, and a novel means for locking said shafts together for one speed and disconnecting said shafts to obtain another speed.

Still another object of my invention is to provide a novel gearing means for obtaining two speeds in the outer chuck shaft including compound gears, each gear having a known number of teeth and by means of which the gears are arranged in a novel manner to provide a known high and low speed in the outer chuck shaft.

A more specific object of my invention is to provide a novel two speed arrangement in which the motor armature shaft is provided with one gear fixed thereto and two adjacent freely rotatable compound gears and wherein the inner portion of the chuck shaft is provided with a compound gear freely rotatable thereon and a compound gear fixed thereto, said gears all being in constant mesh with the gears on said motor armature shaft and wherein the outer portion of the chuck shaft is provided with a sliding gear keyed, splined, or otherwise slidably attached thereto, whereby movement of the sliding gear to one position causes the outer chuck shaft to be driven directly from the inner chuck shaft and movement of said sliding gear in the other position will disconnect the inner chuck shaft therefrom and the outer chuck shaft will be driven through the last compound gear on the armature shaft, each position giving a different speed to the outer chuck shaft and drill bit.

A still further object of my invention is to provide a simple, practical and reliable construction that is economical to manufacture, easy to assemble, and positive in its operation.

With the above and other objects in view, which will become more readily apparent as the nature of the invention is better understood, the same consists in the novel construction, combination and arrangement of parts hereinafter more fully described, illustrated and claimed.

Figure 2:
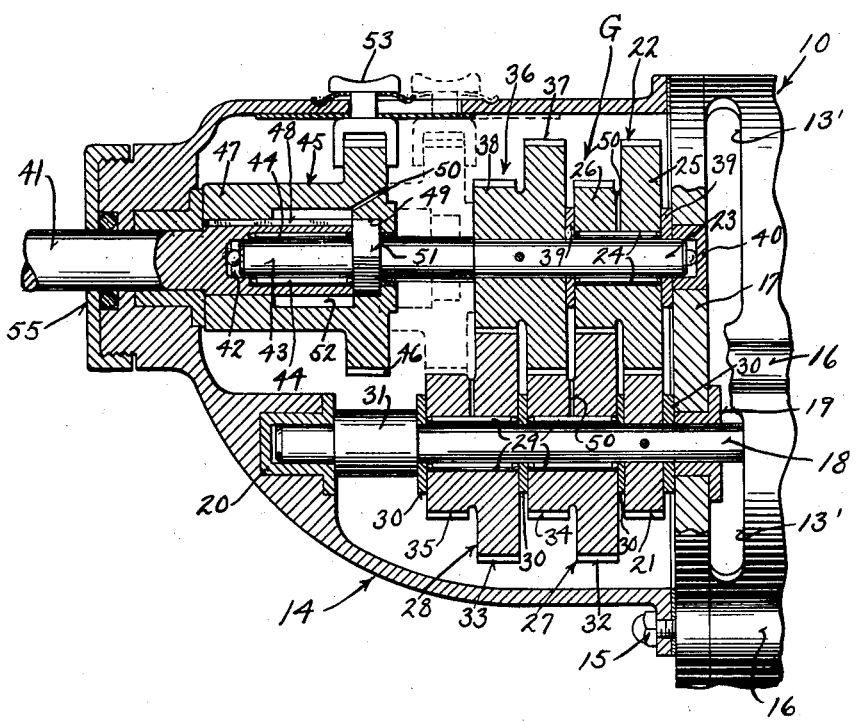

One preferred and practical embodiment of my invention is shown in the accompanying drawings, in which drawings, Figure 1 is a side elevational view of a portable hand electric drill embodying my invention, and Figure 2 is an enlarged fragmentary view partly in section showing my two speed gearing and novel housing arrangement with the two positions of the sliding gear shown in full and dotted lines.

Referring now to the drawings in detail, wherein similar reference characters designate corresponding parts throughout the several views, the letter G generally indicates one type of my improved two speed arrangement and the same is shown incorporated in a conventional hand electric drill D. The hand electric drill D forms no part of my present invention and may be of any conventional design or make now on the market. However, for the purpose of illustration the same includes a main casing 10 housing an electric motor, a handle 11, wires 12 leading to a source of electrical energy, and a chuck 13 for holding various types of drill bits (not shown). The motor and certain parts may be cooled by providing the openings or slots 13'.

My novel gearing G is housed in a compact outer housing 14 and this housing may be detachably secured to the main housing 10 by use of the headed bolts 15, which, of course, extend into internally threaded portions 16 of the main casing 10.

The gearing housing 14 is separated from the main housing 10 by the front wall 17 and the armature shaft 18 of the motor extends (usually centrally) through the wall 17 and is rotatably supported by a suitable bearing 19 and an end bearing 20 formed in the outer housing 14. Pinned, or otherwise secured, to the armature shaft 18 is a drive gear 21 and this gear meshes with a compound gear 22 which is an idle gear and is freely rotatable on the inner chuck shaft 23 by means of any type of adequate bearing, such as needle bearings 24 or the like. The compound idle gear 22 includes a larger gear 25 and a smaller gear 26, the gear 25 meshing with gear 21 and having a greater outer circumference and a greater number of teeth than the smaller gears 26 or 21. However, for the purpose of illustration the same includes a main casing 10 housing an electric motor, a handle 11, wires 12 leading to a source of electrical energy, and a chuck 13 for holding various types of drill bits (not shown). The motor and certain parts may be cooled by providing the openings or slots 13'.

My novel gearing G is housed in a compact outer housing 14 and this housing may be detachably secured to the main housing 10 by use of the headed bolts 15, which, of course, extend into internally threaded portions 16 of the main casing 10.

The gearing housing 14 is separated from the main housing 10 by the front wall 17 and the armature shaft 18 of the motor extends through the wall 17 and is rotatably supported by a bearing 19 and an end bearing 20 formed in the outer housing 14. Pinned or otherwise secured to the armature shaft 18 is a drive gear 21 and this gear meshes with a compound gear 22 which is an idle gear and is freely rotatable on the inner chuck shaft 23 by means of the needle bearings 24. The compound idle gear 22 includes a larger gear 25 and a smaller gear 26, the bear 25 meshing with gear 21 and having a greater outer circumference and a greater number of teeth than the smaller gears 26 or 21.

I also provide two other freely rotatable compound idle gears 27 and 28, each of which are freely rotatable on the armature shaft 18 and are also provided with bearings, needle bearings, or the like 29, and all of the gears 21, 27 and 28 are separated one from the other by means of washers 30, and gear 28 is suitably spaced from the bearing 20 by means of an enlarged collar ring 31 which may be formed either integral with the armature shaft 28 or keyed thereto, as desired. Each of the compound gears 27 and 28 also include larger gears 32 and 33 and smaller gears 34 and 35 respectively, and preferably, these compound gears are identical in size and number of teeth and large gear 32 of compound gear 27 meshes with small gear 26 of compound gear 22.

Immediately adjacent the compound gear 22 is another compound gear 36 and this gear is keyed, splined, or otherwise secured to the inner chuck shaft 23, and of course, also includes a large gear 37 and a small gear 38. The small gear 34 of compound gear 27 meshes with large gear 37 of compound gear 36 and small gear 38 of compound gear 36 meshes with large gear 33 of compound gear 28. These gears are always meshed as shown in the full lines of Figure 2 of the drawing, and I also separate compound gear 22 and compound gear 36 by means of washers 39.

One end of the inner chuck shaft 23 is received in a suitable bearing 40 which is secured in the wall 17 and inner chuck shaft 23 is freely rotatable in relation to the main outer chuck shaft 41. This arrangement may be had by providing a deep central recess or bore 42 in the inner end of chuck shaft 41 and this recess receives the outer end 43 of the inner chuck shaft 23, and I also provide needle bearings 44 or any other type of bushing or bearing so that the shafts may easily and freely rotate in relation to one another.

The outer end of chuck shaft 41 carries the drill chuck 13 and mounted on the inner end of chuck shaft 41 is a sliding clutch gear 45 and the same includes the large gear 46 and an elongated reduced barrel portion 47, and the reduced barrel portion 47 is slidably keyed to the shaft 41 by means of the slot and key arrangement 48. Obviously, any other method of securing the sliding clutch gear 45 to shaft 41 so that the gear is slidable may be used (for example, the shaft 41 may be hexagonical in shape and the inner portion of the reduced barrel may have a hexagonical aperture). This sliding gear 45 is provided with a central aperture entirely therethrough and the extreme inner end 49 is preferably formed in the shape of a hexagon, but may be any kind of irregular shape. Adjacent the end 43 of inner chuck shaft 23, I provide a hexagon or similarly shaped abutment 51 of a size and configuration to be received in the hexagon aperture 49 of the sliding gear 45.

Immediately adjacent the hexagon aperture 49 in the reduced barrel portion 47 of slide gear 45, I provide an elongated enlarged compartment 52, and it is obvious that when the slide gear 45 is moved by means of the button and fork arrangement 53 from its full line to its dotted line position that the hexagon abutment 51 of the inner chuck shaft 23 will be received in the enlarged compartment 52 and that inner chuck shaft 23 and outer chuck shaft 41 will then be freely rotatable in relation to one another. As soon as the hexagon portion 51 of shaft 23 disengages from the aperture, the large gear 46 of the sliding gear 45 will mesh with the small gear 33 of the idle gear 28 and the outer chuck shaft 41 will then be driven through gear 21, compound gear 22, compound gear 27, compound gear 36, compound gear 28 and large gear 46 of sliding gear 45 to give a further reduced speed to the outer chuck shaft 41. The so-called high speed drive for shaft 41 is had when the sliding clutch gear 45 is in its full lined position as shown in Figure 2 of the drawing, with the hexagon abutment 51 received in the hexagon aperture 49 of the sliding clutch gear 45, and the drive is then had from the armature shaft 18 through drive gear 21, compound gear 22, compound gear 27, compound gear 36, and through sliding gear 45, which in this position, merely forms a lock to bind the two chuck shafts 23 and 41 so that they may rotate together in a direct drive.

It should be observed that all of the needle bearings may be lubricated by providing the respective gears with lubrication ports 50.

Further, the remaining bearings and gears themselves may be lubricated by any known method; if desired I may completely seal the housing 14 and have the gears operate in oil or grease and suitable seals such as the O-ring and cap 55 must then be provided.

In any event, it can be seen that various combinations of speeds may be given the outer chuck shaft 41, depending on the speed of the armature shaft 18 and the number of teeth in the larger and smaller gears. For example, if we assume that the drive gear 21 is provided with 16 teeth and that each of the compound gears are provided with 33 teeth in the large gear and 16 teeth in the small gear, with the large gear 46 of the sliding clutch gear 45 provided with 33 teeth, then the following two speeds may be had in the outer chuck shaft 41 when the armature shaft 18 is driven at 15,000 R. P. M.:

(a) High speed approximately 1,700 R. P. M.
(b) Low speed approximately 400 R. P. M.

These speeds are obtained in the following manner:

With the armature shaft 18 rotating at 15,000 R. P. M., drive gear 21 will be driven at 15,000 R. P. M., compound gear 22 will be driven, due to the difference in size and number of teeth in gears (utilizing the formula 15,000:33::$x$:16) at approximately 7,272 R. P. M., and this compound gear 22 will rotate compound gear 27 at approximately 3,526 R. P. M. (utilizing formula 7272:33::$x$:16), and due to the reduction, compound gear 27 will rotate compound gear 36 at approximately 1709 R. P. M. (3526:33::$x$:16). Due to the fact that compound gear 36 is keyed to the shaft 23, and with the sliding clutch gear 45 in its full line position, a direct drive is had from shaft 23 to shaft 41, and then the chuck shaft 41 will be rotated at the high speed of approximately 1,709 R. P. M. When the sliding gear 45 is moved from its full line position to its dotted line position, shaft 23 and shaft 41 will be disconnected, one from the other, and will rotate freely in relation to one another, and large gear 46 will then mesh with small gear 35 of compound gear 28, and due to the reduction, compound gear 28 has been rotating at approximately 828 R. P. M. (1709:33::$x$:16) and compound gear 28 will then rotate gear 46 at approximately 401 R. P. M. (828:33::$x$:16). Due to the fact that sliding gear 45 is keyed to the shaft 41, the outer chuck shaft 41 will now be rotated at 401 R. P. M. for its reduced speed.

Taking the same gear and teeth arrangement and applying the same formula, if the armature shaft rotates at 16,000 R. P. M., the high speed will be approximately 1,853 R. P. M. and the low speed will be approximately 435 R. P. M., and if the armature shaft 18 rotates at 17,000 R. P. M., the high speed will be approximately 1,937 R. P. M. and the low speed will be approximately 455 R. P. M., and as a last example, if the armature shaft rotates at 18,000 R. P. M., the high speed will be approximately 2,051 R. P. M. and the low speed will be approximately 488 R. P. M. Naturally, by varying the number of teeth in each gear almost any combination of two speeds may be had at any given armature shaft speed, but I have found that the most desirable range is a high speed of around 2,000 R. P. M., plus or minus, and a low speed of around 400 R. P. M., plus or minus. Most motors in electric hand drills rotate the armature shaft in the range between 9,000 R. P. M. and 18,000 R. P. M., and therefore, the ratio of 33 teeth for the larger gears to 16 teeth for the small gears in each compound gear has been found to be the best suited of any ratio.

I wish to stress that one of the salient features of my invention is the compact arrangement of my gears in the housing 14 and the novel manner and arrangement of my housing 14 in relation to the main housing 10 and the armature shaft 18 to give a compact portable electric hand drill having two ranges of speed or drives in the chuck shaft 41.

From the foregoing, it is believed that the features and advantages of my invention will be readily apparent to those skilled in the art, and it will, of course, be understood that changes in the form, proportion and minor details of construction may be resorted to without departing from the spirit of the invention or the scope of the appended claim.

I claim:

A portable electric hand drill comprising a main casing housing an electric motor therein, a handle adjacent one end of said casing, a driven armature shaft on said motor extending through said main casing and projecting outwardly on the opposite end from said handle, a relatively small auxiliary casing about said armature shaft and carrying a bearing for the extreme outer end of said armature shaft, said small casing being detachably secured to said main casing, a chuck shaft rotatably mounted in said auxiliary casing and extending longitudinally with said driven armature shaft, said chuck shaft being formed in two sections to provide an inner shaft section entirely within said small casing and an outer shaft section projecting outwardly from said small casing, each section being individually rotatable with respect to one another, a series of compound gears arrangement on said driven shaft and said inner chuck shaft section in constant mesh and providing one speed of rotation to the inner shaft section, a sliding clutch gear keyed to the otuer shaft section and adapted in one position to lock the two sections of said chuck shaft in direct drive, and means for sliding said clutch gear to another position to disconnect the two sections and to drive the clutch gear in another reduced speed, whereby the outer chuck shaft section may be selectively driven at two different speeds of rotation.

References Cited in the file of this patent

UNITED STATES PATENTS

| | | |
|---|---|---|
| 2,486,254 | Briskin et al. | Oct. 25, 1949 |
| 2,534,951 | Cargill | Dec. 19, 1950 |

FOREIGN PATENTS

| | | |
|---|---|---|
| 352,394 | Germany | Apr. 24, 1922 |